US012344938B2

(12) United States Patent
Strock et al.

(10) Patent No.: US 12,344,938 B2
(45) Date of Patent: Jul. 1, 2025

(54) THERMAL BARRIER COATING FOR GAS TURBINE ENGINE COMPONENTS

(71) Applicant: RAYTHEON TECHNOLOGIES CORPORATION, Farmington, CT (US)

(72) Inventors: Christopher W. Strock, Kennebunk, ME (US); Michael J. Maloney, Marlborough, CT (US); David A. Litton, West Hartford, CT (US); Benjamin Joseph Zimmerman, Moseley, VA (US); Brian T. Hazel, Avon, CT (US)

(73) Assignee: RTX Corporation, Farmington, CT (US)

(*) Notice: Subject to any disclaimer, the term of this patent is extended or adjusted under 35 U.S.C. 154(b) by 8 days.

(21) Appl. No.: 17/359,855

(22) Filed: Jun. 28, 2021

(65) Prior Publication Data

US 2021/0324506 A1 Oct. 21, 2021

Related U.S. Application Data

(62) Division of application No. 13/603,891, filed on Sep. 5, 2012, now Pat. No. 11,047,033.

(51) Int. Cl.
*C23C 4/02* (2006.01)
*C23C 4/11* (2016.01)
(Continued)

(52) U.S. Cl.
CPC .................. *C23C 4/02* (2013.01); *C23C 4/11* (2016.01); *C23C 4/134* (2016.01); *C23C 28/321* (2013.01);
(Continued)

(58) Field of Classification Search
CPC .. C23C 4/02; C23C 4/11; C23C 4/134; C23C 28/321; C23C 28/3215; C23C 28/3455; C23C 28/347
See application file for complete search history.

(56) References Cited

U.S. PATENT DOCUMENTS 5,660,885 A 8/1997 Hasz et al.
6,177,200 B1 1/2001 Maloney
(Continued)

FOREIGN PATENT DOCUMENTS

EP 2053141 A1 4/2009
EP 2341166 A1 7/2011
(Continued)

OTHER PUBLICATIONS

U.S. Appl. No. 13/408,460, filed Feb. 29, 2012, entitled, "Spallation-Resistant Thermal Barrier Coating".
(Continued)

*Primary Examiner* — Nathan T Leong
(74) *Attorney, Agent, or Firm* — Carlson, Gaskey & Olds, P.C.

(57) ABSTRACT

A component for a gas turbine engine according to an exemplary embodiment of the present disclosure can include a substrate, a thermal barrier coating deposited on at least a portion of the substrate, and an outer layer deposited on at least a portion of the thermal barrier coating. The outer layer can include a material that is reactive with an environmental contaminant that comes into contact with the outer layer to alter a microstructure of the outer layer.

20 Claims, 2 Drawing Sheets

(51) Int. Cl.

| | |
|---|---|
| ***C23C 4/134*** | (2016.01) |
| ***C23C 28/00*** | (2006.01) |
| ***F01D 5/28*** | (2006.01) |

(52) U.S. Cl.

CPC ...... *C23C 28/3215* (2013.01); *C23C 28/3455* (2013.01); *C23C 28/347* (2013.01); *F01D 5/288* (2013.01); *F05D 2300/13* (2013.01); *F05D 2300/514* (2013.01); *Y10T 428/249981* (2015.04); *Y10T 428/31678* (2015.04)

(56) References Cited

U.S. PATENT DOCUMENTS

| | | | | |
|---|---|---|---|---|
| 6,641,893 | B1 | 11/2003 | Suresh et al. | |
| 6,982,126 | B2 | 1/2006 | Darolia et al. | |
| 7,326,470 | B2 | 2/2008 | Ulion et al. | |
| 7,368,164 | B2 | 5/2008 | Stowell et al. | |
| 7,736,759 | B2 | 6/2010 | Schlichting et al. | |
| 7,780,832 | B2 | 8/2010 | Hasz | |
| 7,833,586 | B2 | 11/2010 | Margolies | |
| 7,875,370 | B2 | 1/2011 | Schlichting et al. | |
| 7,910,173 | B2 | 3/2011 | Spitsberg et al. | |
| 8,021,742 | B2 | 9/2011 | Anoshkina et al. | |
| 8,080,283 | B2 | 12/2011 | Schlichting et al. | |
| 2003/0138658 | A1 | 7/2003 | Taylor et al. | |
| 2004/0126599 | A1 | 7/2004 | Wigren et al. | |
| 2007/0036997 | A1 | 2/2007 | Floyd et al. | |
| 2007/0116883 | A1 | 5/2007 | Gorman et al. | |
| 2008/0044662 | A1 | 2/2008 | Schlichting et al. | |
| 2008/0145643 | A1 | 6/2008 | Reynolds et al. | |
| 2008/0160172 | A1 | 7/2008 | Taylor et al. | |
| 2008/0167173 | A1 | 7/2008 | Lima et al. | |
| 2008/0176097 | A1* | 7/2008 | Schlichting | F01D 5/288 428/668 |
| 2008/0305264 | A1* | 12/2008 | Spitsberg | C23C 28/3455 427/258 |
| 2009/0038935 | A1 | 2/2009 | Floyd et al. | |
| 2009/0110903 | A1 | 4/2009 | Margolies | |
| 2009/0186237 | A1 | 7/2009 | Lee | |
| 2010/0008770 | A1 | 1/2010 | Hazel et al. | |
| 2010/0129636 | A1 | 5/2010 | Cybulsky et al. | |
| 2010/0154422 | A1 | 6/2010 | Kirby et al. | |
| 2010/0159151 | A1 | 6/2010 | Kirby et al. | |
| 2011/0151132 | A1 | 6/2011 | Nagaraj et al. | |
| 2011/0151219 | A1 | 6/2011 | Nagaraj et al. | |
| 2011/0244216 | A1* | 10/2011 | Meyer | C23C 28/345 427/446 |
| 2014/0065408 | A1 | 3/2014 | Strock et al. | |

FOREIGN PATENT DOCUMENTS

| | | | |
|---|---|---|---|
| WO | 2013103425 | A2 | 7/2013 |
| WO | 2014007901 | A2 | 1/2014 |
| WO | 2014028419 | A1 | 2/2014 |

OTHER PUBLICATIONS

U.S. Appl. No. 13/437,261, filed Apr. 2, 2012, entitled, “Hybrid Thermal Barrier Coating”.

Toughening of Nontransformable t’-YSZ By Addition of Titania, by Tobias A. Schaedler, Rafael M. Leckie, Stephan Kramer, Anthony G. Evans and Carlos G. Levi, Journal of the American Ceramic Society, vol. 90, No. 12, pp. 3896-3901 (2007).

Application of Suspension Plasma Spraying (SPS) for Manufacture of Ceramic Coatings, by Holger Kassner, Roberto Siegert, Dag Hathiramani, Robert Vassen and Detlev Stoever (submitted Feb. 22, 2007; in revised form May 24, 2007), Journal of Thermal Spray Technology, vol. 17(1), Mar. 2008, pp. 115-123.

International Search Report for PCT Application No. PCT/US2013/054088 dated May 26, 2014.

* cited by examiner

THERMAL BARRIER COATING FOR GAS TURBINE ENGINE COMPONENTS

CROSS-REFERENCED TO RELATED APPLICATION

This application is a divisional of U.S. application Ser. No. 13/603,891, which was filed on Sep. 5, 2012.

BACKGROUND

This disclosure relates generally to a gas turbine engine, and more particularly to a thermal barrier coating that can be applied to a component of a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Some gas turbine engine components, including blades, vanes, blade outer air seals (BOAS) and combustor panels, may operate in relatively harsh environments. For example, blade and vane airfoils of the compressor and turbine sections may operate under a variety of high temperature, high stress and corrosive conditions. A thermal barrier coating (TBC) may be deposited on such components to protect against environmental contaminants that can come into contact with the surfaces of these components.

Environmental contaminants may be ingested by the gas turbine engine during flight and can reduce the durability of components that are positioned in the gas path of the gas turbine engine. Example environmental contaminants that can potentially reduce the part life and durability of a TBC include volcanic ash, dust, sand and/or other materials that, at higher operating temperatures, can form calcium-magnesium-alumino-silicate (CMAS) infiltrants that penetrate the TBC.

SUMMARY

A component for a gas turbine engine according to an exemplary embodiment of the present disclosure can include a substrate, a thermal barrier coating deposited on at least a portion of the substrate, and an outer layer deposited on at least a portion of the thermal barrier coating. The outer layer can include a material that is reactive with an environmental contaminant that comes into contact with the outer layer to alter a microstructure of the outer layer.

In a further embodiment of the foregoing embodiment, the thermal barrier coating can include a first porosity and the outer layer can include a second porosity that is greater than the first porosity.

In a further embodiment of either of the foregoing embodiments, a solid portion is formed in at least one porous region of the second porosity in response to the reaction between the material and the environmental contaminant.

In a further embodiment of any of the foregoing embodiments, the thermal barrier coating includes a first porosity in the range of approximately 8% to 25% by volume and the outer layer includes a second porosity in the range of 20% to 50% by volume.

In a further embodiment of any of the foregoing embodiments, the material includes gadolinia zirconia.

In a further embodiment of any of the foregoing embodiments, the material includes hafnia.

In a further embodiment of any of the foregoing embodiments, the material includes a lanthanide mixture.

In a further embodiment of any of the foregoing embodiments, the thermal barrier coating and the outer layer are suspension plasma sprayed (SPS).

In a further embodiment of any of the foregoing embodiments, the environmental contaminant includes a calcium-magnesium-alumino-silicate (CMAS) infiltrant.

In a further embodiment of any of the foregoing embodiments, at least a portion of the outer layer is shed from the outer layer after the reaction with the environmental contaminant.

In a further embodiment of any of the foregoing embodiments, the outer layer is deposited over an entire surface area of the thermal barrier coating.

In a further embodiment of any of the foregoing embodiments, the reaction between the material and the environmental contaminant forms a solid portion within at least one porous region of the outer layer to limit infiltration of the environmental contaminant into the thermal barrier coating.

A method of coating a component of a gas turbine engine according to another exemplary embodiment of the present disclosure includes applying a thermal barrier coating onto at least a portion of a substrate of the component; and applying an outer layer onto at least a portion of the thermal barrier coating using the same application technique used to apply the thermal barrier coating. The outer layer includes a material that is reactive with an environmental contaminant that comes into contact with the outer layer to alter a microstructure of the outer layer.

In a further embodiment of the foregoing method, each of the steps of applying include using a suspension plasma spray (SPS) technique.

In a further embodiment of either of the foregoing methods, the material includes gadolinia zirconia.

In a further embodiment of any of the foregoing methods, the material includes hafnia.

In a further embodiment of any of the foregoing methods, the material includes a zirconia based ceramic.

In a further embodiment of any of the foregoing methods, the thermal barrier coating includes a first porosity in the range of approximately 8% to 25% by volume and the outer layer includes a second porosity in the range of approximately 20% to 50% by volume.

In a further embodiment of any of the foregoing methods, a solid portion formed within at least one porous region of the outer layer is shed subsequent to the reaction between the material and the environmental contaminant.

In a further embodiment of any of the foregoing methods, the steps of applying are performed using a suspension plasma spray technique that applies each of the thermal barrier coating and the outer layer in a plurality of individual coating passes, wherein a first coating pass of the plurality of individual coating passes includes a first material composition and a second coating pass of the plurality of individual coating passes includes a second material composition that is different from the first material composition.

The various features and advantages of this disclosure will become apparent to those skilled in the art from the following detailed description. The drawings that accompany the detailed description can be briefly described as follows.

DETAILED DESCRIPTION

Figure 1:
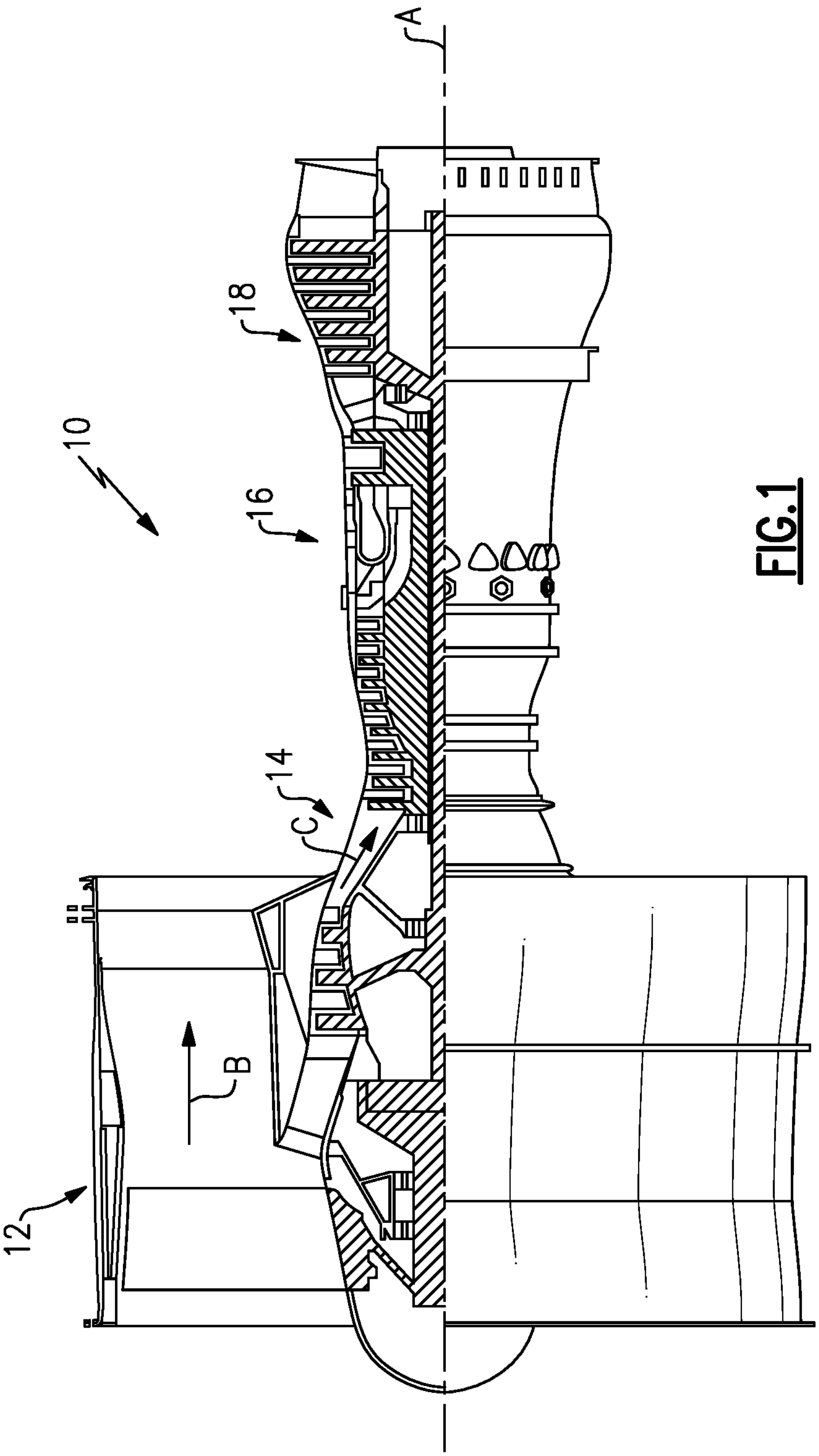
FIG. 1 illustrates a schematic, cross-sectional view of a gas turbine engine.

FIG. 1 illustrates an exemplary gas turbine engine 10 that is circumferentially disposed about an engine centerline axis A. The gas turbine engine 10 includes a fan section 12, a compressor section 14, a combustor section 16 and a turbine section 18. Generally, during operation, the fan section 12 drives air along a bypass flow path B, while the compressor section 14 drives air along a core flow path C for compression and communication into the combustor section 16. The hot combustion gases generated in the combustor section 16 are discharged through the turbine section 18, which extracts energy from the combustion gases to power other gas turbine engine loads. Although depicted as a turbofan gas turbine engine in the disclosed non-limiting embodiment, it should be understood that the concepts described herein are not limited to turbofan engines and these teachings could extend to other types of engines, including but not limited to, three spool engine architectures.

The gas turbine engine 10 may include a plurality of components that are generally disposed within the core flow path C and are therefore exposed to relatively harsh operating conditions. Examples of such components include, but are not limited to, blades, vanes, blade outer air seals (BOAS), combustor panels, airfoils and other components. One example operating condition experienced by these components includes exposure to environmental contaminants.

For example, the gas turbine engine 10 can ingest particles during operation including dust, sand, and/or volcanic ash that can form calcium-magnesium-alumino-silicate (CMAS) infiltrants that may reduce the structural integrity of the components. Other environmental contaminants may also exist. Any component subject to environmental contaminants of these types can be coated with a thermal barrier coating (TBC) that provides improved resistance to environmental contaminants, as is further discussed below.

Figure 2:
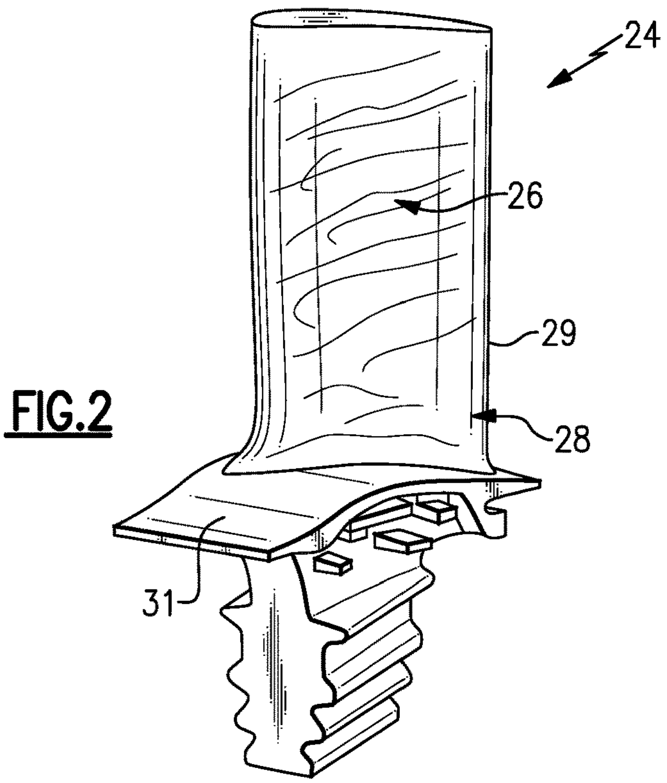
FIG. 2 illustrates an exemplary component that can be incorporated into a gas turbine engine.

FIG. 2 illustrates an exemplary component 24 that can be incorporated into a gas turbine engine, such as the gas turbine engine 10 of FIG. 1. In this exemplary embodiment, the component 24 is a blade that can be incorporated into the core flow path C of either the compressor section 14 or the turbine section 18 of the gas turbine engine 10. However, the component 24 could also be a vane, a combustor panel, a BOAS, or any other component of the gas turbine engine 10. The component 24 may be formed of a superalloy material, such as a nickel based alloy, a cobalt based alloy, molybdenum, niobium or other alloy, or from a ceramic any ceramic materials including ceramic matrix composites. Given this description, a person of ordinary skill in the art would recognize other types of alloys to suit a particular need.

The component 24 can include a thermal barrier coating (TBC) 26 for protecting an underlying substrate 28 of the component 24. The thermal barrier coating (TBC) 26 may be deposited on all or a portion of the substrate 28 to protect the substrate 28 from the environment, including but not limited to CMAS infiltrates. The thermal barrier coating 26 may comprise one or more layers of a ceramic material such as a yttria stabilized zirconia material or a gadolinia stabilized zirconia material. Other TBC materials are also contemplated as being within the scope of this disclosure.

In the exemplary embodiment illustrated by FIG. 2, the substrate 28 is an airfoil portion 29 of the component 24. Alternatively, the substrate 28 may be a platform portion 31, a combination of a platform and an airfoil, or any other portion of the component 24.

Figure 3:
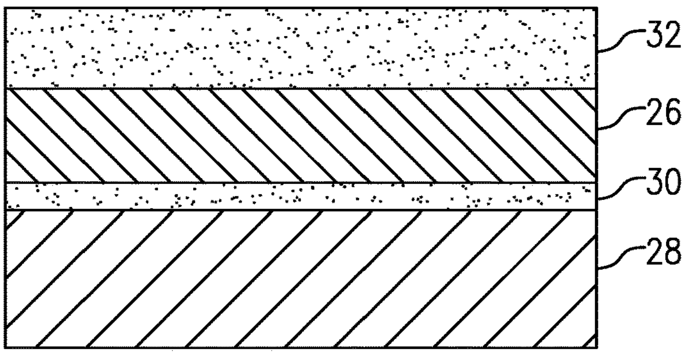
FIG. 3 illustrates a component of a gas turbine engine that includes a thermal barrier coating (TBC) having an outer layer that can be deposited onto the TBC to protect the TBC from environmental contaminants.

Referring to FIG. 3, the TBC 26 is deposited on at least a portion of the substrate 28. Optionally, a bond coat 30 may be deposited between the TBC 26 and the substrate 28 to facilitate bonding between the TBC 26 and the substrate 28. It should be understood that the various thicknesses of the TBC 26, the bond coat 30 and any other layers included on the substrate 28 are not necessarily shown to the scale they would be in practice. Rather, these features are shown exaggerated to better illustrate the various features of this disclosure.

In one exemplary embodiment, the bond coat 30 is a metallic bond coat such as an overlay bond coat or a diffusion aluminide. The bond coat 30 may be a metal-chromium-aluminum-yttrium layer ("MCrAlY"), or an aluminide or platinum aluminide, or a lower-aluminum gamma/gamma prime-type coating. The bond coat 30 may further include a thermally grown oxide (not shown) for further enhancing bonding between the layers. One exemplary bond coat 30 is PWA 1386 NiCoCrAlYHfSi. Alternative bond coats 30 are gamma/gamma prime and NiAlCrX bondcoats, where X indicates additional metallic alloying elements.

The bond coat 30 can embody a variety of thicknesses. One exemplary bond coat 30 thicknesses is 2-500 micrometers. Another exemplary bond coat 30 thickness is 12-250 micrometers. Yet another exemplary bond coat 30 thickness is 25-150 micrometers.

An outer layer 32 can also be deposited onto at least a portion of the TBC 26 on an opposite side of the TBC 26 from the substrate 28. The outer layer 32 can protect the TBC 26 from CMAS infiltrants and/or other environmental contaminants. In one exemplary embodiment, the outer layer 32 includes a higher porosity, a reduced density and a reduced modulus of elasticity as compared to the TBC 26. For example, one air plasma sprayed TBC 26 may include a first porosity in the range of approximately 8%-25% (by volume) and the outer layer 32 may include a second porosity that is in the range of 20%-50% (by volume). Another air plasma sprayed TBC 26 may include a first porosity in the range of approximately 20%-28% (by volume), while the outer layer 32 may include a second porosity in the range of 40%-60% (by volume). The second porosity of the outer layer 32 can be between 20% and 80% (by volume) depending upon design specific parameters. The resulting structure of the outer layer 32 acts as a barrier to prevent the environmental contaminants from reaching the TBC 26 due to its higher porosity and ability to capture the molten contaminants. A finer porosity distribution promotes increased reactivity for a given porosity content.

The outer layer 32 may include a material that is reactive with an environmental containment that comes into contact with the outer layer 32 during gas turbine engine operation, as is discussed in greater detail below. In one example, the material of the outer layer 32 includes gadolinia zirconia. In another example, the material includes halfnia. In yet another example, the material includes a zirconia based ceramic material. In still another example, the material includes a mixture of a lanthanide with one of Y, Sc, Im and Ce.

The outer layer 32 can be disposed over only a portion of the TBC 26, or can be deposited over an entire surface area of the TBC 26. In other words, the outer layer 32 can partially or entirely encompass the TBC 26.

Both the TBC 26 and the outer layer 32 can be applied to the component 24 using the same application technique and same equipment. One exemplary application technique includes a suspension plasma spray (SPS) technique. The SPS technique enables a homogenous coating composition of multi-component ceramics that have varied vapor pressures because it relies on melting/softening of the ceramic and not vaporization during the transport to the substrate 28. In one exemplary SPS technique, a feedstock is dispersed as a suspension in a fluid, such as ethanol, and injected wet into the gas stream. Splat sizes in the SPS technique with micron or submicron powder feedstock may be about ½ micron to about 3 microns in diameter and may include thicknesses of less than a micron. The resulting microstructures in the SPS technique deposited layers have features that are much smaller than conventional plasma sprayed microstructures.

In another exemplary SPS technique, the thermal barrier coating 26 and the outer layer 32 can be deposited in a manner that varies both the composition and structure of the coatings to provide deposited coatings having different microstructures. One example of such a SPS technique is disclosed in Kassner, et al., Journal of Thermal Spray Technology, Volume 17, pp. 115-123 (March, 2008). This reference is incorporated herein in its entirety. Another example SPS technique that can be used is disclosed by Trice, et al., Journal of Thermal Spray Technology, Volume 20, p. 817 (2011), which is also incorporated herein by reference. In yet another exemplary SPS technique, the TBC 26 can include a columnar microstructure, where columnar can include a dense vertically cracked that is formed by the SPS technique.

Both the TBC 26 and the outer layer 32 can be applied with varying parameters and compositions in a plurality of individual coating passes using a SPS technique. For example, a first coating pass of the plurality of individual coating passes can include a first material composition, such as 7 wt % yttria stabilized zirconia (7YSZ) with a first set of spray conditions including torch power, suspension feed rates, plasma gas flows, relative motions between the substrate and torch, etc., and a second coating pass of the plurality of individual coating passes can include a second material composition (and spray conditions) that is different from the first material composition (and spray conditions). In this manner, each individual coating pass can be applied with its own unique porosity, density and modulus of elasticity. In one exemplary embodiment, each individual coating pass can be between 1 to 25 microns in thickness and the torch to part motions and distance are controlled in a manner that result in varied coating porosities.

Figure 4:
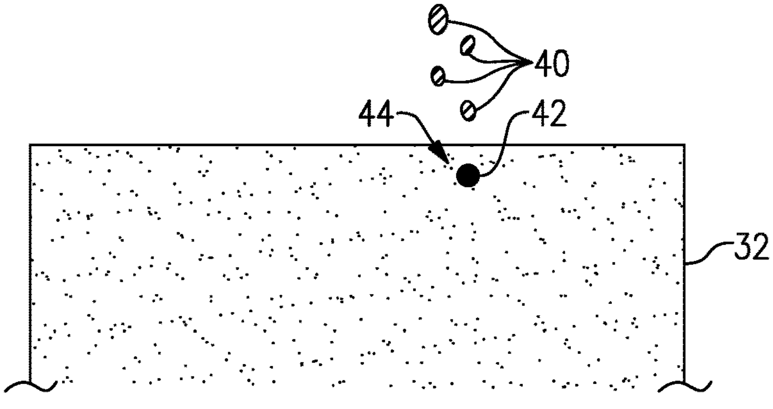
FIG. 4 illustrates a portion of an outer layer that can be deposited over a TBC.

FIG. 4 illustrates a portion of the outer layer 32. The material of the outer layer 32 may be reactive with an environmental contaminant 40 that contacts the outer layer 32 during operation of the gas turbine engine 10. During this reaction, a microstructure of the outer layer 32 may be altered. For example, the reaction between the outer layer 32 and the environmental contaminant 40 can produce an infiltrated or solid portion 42 that is formed in at least one porous region 44 of the outer layer 32. In becoming infiltrated, this solid portion 42 absorbs and sequesters the contaminants and thus can prevent further infiltration of an environmental contaminant 40 into the TBC 26 and the component 24.

The outer layer 32 may provide a large volume fraction of porosity which absorbs and/or reacts to sequester a given amount of the environmental contaminant 40. Once sufficiently infiltrated, the elastic modulus of the affected region is increased and upon cooling experiences relatively high stresses that may cause shedding upon cooling. The volume of TBC 26 that is lost is thereby reduced by the ratio of porosity between the outer layer 32 and the TBC 26 due to the ability of the high porosity layer 32 to sequester contaminants in a relatively smaller volume of coating compared to layer 26.

Although the different non-limiting embodiments are illustrated as having specific components, the embodiments of this disclosure are not limited to those particular combinations. It is possible to use some of the components or features from any of the non-limiting embodiments in combination with features or components from any other non-limiting embodiments.

It should be understood that like reference numerals identify corresponding or similar elements within the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A method of coating a component of a gas turbine engine, comprising:

applying a thermal barrier coating onto at least a portion of a substrate of the component; and applying an outer layer onto at least a portion of the thermal barrier coating using the same application technique used to apply the thermal barrier coating, wherein the outer layer includes a material that is reactive with an environmental contaminant that comes into contact with the outer layer to alter a microstructure of the outer layer, wherein said thermal barrier coating includes a first priority in a range of approximately 20% to 28% by volume and said outer layer includes a second priority in a range of 40% to 60% by volume.

2. The method as recited in claim 1, wherein each of the steps of applying include using a suspension plasma spray (SPS) technique.

3. A method of coating a component of a gas turbine engine, comprising:

applying a thermal barrier coating onto at least a portion of a substrate of the component; and applying an outer layer onto at least a portion of the thermal barrier coating using the same application technique used to apply the thermal barrier coating, wherein the outer layer includes a material that is reactive with an environmental contaminant that comes into contact with the outer layer to alter a microstructure of the outer layer, wherein the thermal barrier coating includes a first porosity in a range of approximately 8% to 25% by volume and the outer layer includes a second porosity in a range of approximately 20% to 50% by volume.

4. The method as recited in claim 1, comprising the step of:

shedding a solid portion formed within at least one porous region of the outer layer subsequent to the reaction between the material and the environmental contaminant.

5. The method as recited in claim 1, wherein the steps of applying are performed using a suspension plasma spray technique that applies each of the thermal barrier coating and the outer layer in a plurality of individual coating passes, wherein a first coating pass of the plurality of individual coating passes includes a first material composition and a second coating pass of the plurality of individual coating passes includes a second material composition that is different from the first material composition.

6. The method as recited in claim 1, wherein said outer layer includes a material that is reactive with an environmental contaminant that comes into contact with said outer layer to alter a microstructure of said outer layer, said material including gadolinia zirconia, hafnia, a lanthanide mixture, or a zirconia based ceramic material.

7. The method as recited in claim 6, wherein said thermal barrier coating includes a first modulus of elasticity and said outer layer includes a second modulus of elasticity that is less than said first modulus of elasticity, and said thermal barrier coating includes a first density and said outer layer includes a second density that is less than said first density.

8. The method as recited in claim 7, wherein said outer layer is comprised of a plurality of individual coating sublayers, and each of said plurality of individual coating sublayers includes its own unique material composition, porosity, density, and modulus of elasticity.

9. The method as recited in claim 8, wherein an infiltrated portion is formed in at least one porous region of said second porosity in response to the reaction between said material and said environmental contaminant, said infiltrated portion absorbing and sequestering additional environmental contaminants, thereby preventing said additional environmental contaminants from infiltrating said thermal barrier coating.

10. The method as recited in claim 1, wherein said outer layer includes a material including gadolinia zirconia configured to react with an environmental contaminant that comes into contact with said outer layer to alter a microstructure of said outer layer.

11. The method as recited in claim 10, wherein an infiltrated portion is formed in said outer layer in response to the reaction between said material and said environmental contaminant, said infiltrated portion absorbing and sequestering additional environmental contaminants, thereby limiting infiltration of said additional environmental contaminants into said thermal barrier coating.

12. The method as recited in claim 11, wherein at least a portion of said outer layer that includes said infiltrated portion is shed from said outer layer after the reaction with said environmental contaminant, said thermal barrier coating and said outer layer are both suspension plasma sprayed layers, and said outer layer is comprised of a plurality of individual coating sublayers, and each of said plurality of individual coating sublayers includes its own unique porosity, density, and modulus of elasticity.

13. The method as recited in claim 1, wherein said outer layer includes a material including gadolinia zirconia that is configured to react with an environmental contaminant that comes into contact with said outer layer to alter a microstructure of said outer layer, wherein the reaction between said material and said environmental contaminant forms an infiltrated portion within at least one porous region of said outer layer, said infiltrated portion absorbing and sequestering additional environmental contaminants, thereby limiting infiltration of said additional environmental contaminants into said thermal barrier coating.

14. The method as recited in claim 13, wherein said thermal barrier coating and said outer layer are both suspension plasma sprayed layers.

15. The method as recited in claim 14, wherein said outer layer is comprised of a plurality of individual coating sublayers, and each of said plurality of individual coating sublayers includes its own unique porosity, density, and modulus of elasticity.

16. A method of coating a component of a gas turbine engine, comprising:

applying a thermal barrier coating onto at least a portion of a substrate of the component; and applying an outer layer onto at least a portion of the thermal barrier coating by applying a plurality of individual coating sublayers, each individual coating sublayer having a thickness between 1 and 25 microns and formed with one of a plurality of individual coating passes of a suspension plasma spray device operated with a different set of spraying conditions from those used to form an adjacent individual coating sublayer, wherein the outer layer includes a material that is reactive with an environmental contaminant that comes into contact with the outer layer to alter a microstructure of the outer layer, and each of said plurality of individual coating sublayers includes its own unique porosity, density, and modulus of elasticity.

17. The method of claim 16, wherein a first individual pass of the plurality of individual coating passes includes 7 wt % yttria stabilized zirconia (7YSZ) with a first set of spray conditions, and a second coating pass of the plurality of individual coating passes includes a second material different from 7 wt % yttria stabilized zirconia (7YSZ).

18. The method of claim 16, wherein:

said thermal barrier coating includes a first porosity in a range of approximately 20% to 28% by volume and said outer layer includes a second porosity in a range of 40% to 60% by volume, said thermal barrier coating includes a first modulus of elasticity and said outer layer includes a second modulus of elasticity that is less than said first modulus of elasticity, and said thermal barrier coating includes a first density and said outer layer includes a second density that is less than said first density, said outer layer includes a material that is reactive with an environmental contaminant that comes into contact with said outer layer to alter a microstructure of said outer layer, said material including gadolinia zirconia, hafnia, a lanthanide mixture of a lanthanide with one of Y, Sc, and Ce, or a zirconia based ceramic material, and an infiltrated portion is formed in at least one porous region of said second porosity in response to the reaction between said material and said environmental contaminant, said infiltrated portion absorbing and sequestering additional environmental contaminants, thereby preventing said additional environmental contaminants from infiltrating said thermal barrier coating.

19. The method of claim 18, the method comprising:

depositing a bond coat between the thermal barrier coating and the substrate, the bond coat including a thermally grown oxide and having a thickness between 25-150 micrometers.

20. The method of claim 16, wherein:

said thermal barrier coating includes a first porosity in a range of approximately 8% to 25% by volume and said outer layer includes a second porosity in a range of 20% to 40% by volume, said thermal barrier coating includes a first modulus of elasticity and said outer layer includes a second modulus of elasticity that is less than said first modulus of elasticity, and said thermal barrier coating includes a first density and said outer layer includes a second density that is less than said first density, said outer layer includes a material that is reactive with an environmental contaminant that comes into contact with said outer layer to alter a microstructure of said outer layer, said material including gadolinia zirconia, hafnia, a lanthanide mixture of a lanthanide with one of Y, Sc, and Ce, or a zirconia based ceramic material, and an infiltrated portion is formed in at least one porous region of said second porosity in response to the reaction between said material and said environmental contaminant, said infiltrated portion absorbing and sequestering additional environmental contaminants, thereby preventing said additional environmental contaminants from infiltrating said thermal barrier coating.

* * * * *